United States Patent Office 3,499,139
Patented Mar. 3, 1970

3,499,139
SPOT WELDING ELECTRODE DESIGNED FOR FINE ELEMENTS
Jan Chmiel, Ul. Sienkiewicza 9m8, Krakow, Poland
Filed Dec. 12, 1966, Ser. No. 601,118
Int. Cl. B23k 9/28
U.S. Cl. 219—144      4 Claims

ABSTRACT OF THE DISCLOSURE

A working tip of a spot welding electrode is adjustably clamped in jaws of an inner sleeve which is axially displaceable with respect to an outer sleeve by means of an externally engageable rotatable body which is threadably engaged with the inner sleeve and is held in axial position on the outer body. The jaws are radially resilient and the degree of clamping pressure on the working tip is regulated by rotation of the externally engageable body, a stem being threadably engaged in the latter body and in contact with the working tip to axially displace the working tip as it becomes worn.

---

This invention is directed to a spot welding electrode and particularly to an electrode adapted for welding elements of a fine size.

The known welding electrodes designed for welding fine elements may be utilized in the welding of any size elements but they are particularly suitable for the spot welding of fine elements having small geometrical dimensions as for example the cups of fuse-links. Such electrodes are also usable in cases where small surfaces are being welded or in cases, where the welded surface is barely accessible requiring the use of an electrode having small dimensions.

Spot welding makes use of monolithic electrodes, i.e. electrodes consisting only of one piece of material, or electrodes having a working tip made of a material other than that of the electrode itself. The working tip, generally constituted of a wear-proof material, has a threaded or pressure connection with the electrode shank. The tips in the case of large electrodes usually are of the threaded connection type but this type connection is not used for electrodes employed in the welding of fine elements.

For the spot welding of fine elements, electrodes are now used in which the working tips are connected with the body of the electrode by pressing the tips into a previously drilled hole. The diameter of the working tip of the electrode is adjusted to the dimensions of the elements to be joined, by grinding the tip to the required dimensions. The operation of grinding the tip of the electrode is laborious and expensive due to the fact that the working tips are normally made of tungsten, and that during the grinding operation a large amount of material constituting the electrode and the working tip is wasted. In addition, there remains in the body of the electrode a part of the working tip which cannot be used since further grinding is impossible due to strength limitations. An additional factor which complicates the use of electrodes in the known form is the necessity of providing a large number of electrodes corresponding to the dimensions of the working tips.

It is an object of the invention to provide an electrode for welding fine elements in which working tips of different size are interchangeable and replaceable.

A resulting feature of the invention is that only the tip is ground and quick replacement can be made of the tip itself, without the necessity of replacement of the entire electrode. In further accordance with the invention several tips having a broad range of diameters can be utilized with each electrode. The necessity of regrinding the tip to the size of the elements to be joined is eliminated. Another feature of the invention resides in the arrangement whereby arbitrary regulation of the length of the working tip is permitted. Additionally, a much more efficient utilization of the expensive working tip is attained due to the fact that the amount of the material to be ground is decreased.

There will next be described a spot welding electrode according to the invention in conjunction with the appended drawing, wherein.

Figure 1:
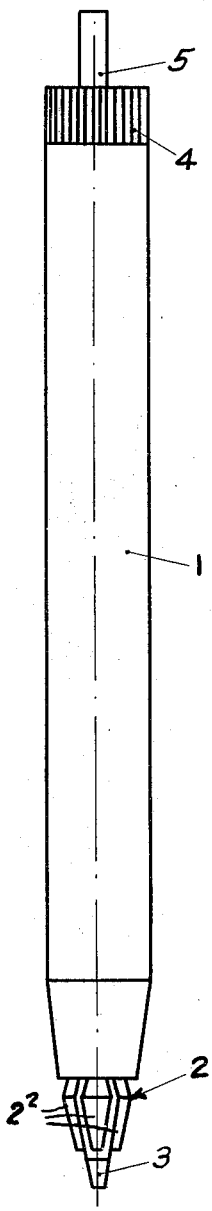
FIGURE 1 is a side elevational view of the electrode.
Figure 2:
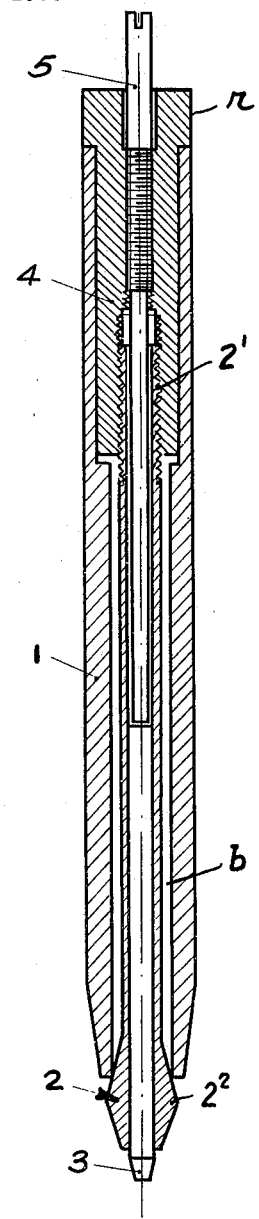
FIGURE 2 is a sectional view of the electrode of FIG. 1.

According to the invention the electrode comprises a body in the form of an elongated sleeve 1 having an axial bore $b$ therein. A second sleeve 2 is mounted in the bore of sleeve 1. The sleeve 2 has a threaded end 2' by which the sleeve is attached to a cylindrical body 4. The sleeve 2 is formed with jaws $2^2$ at the end remote from threaded end 2'. The jaws are separated from one another by the presence of local slits in the end of the sleeve 2. Thereby the jaws are flexible and can be moved radially inwardly and outwardly. The jaws are formed with doubly conical external surfaces, one of which rests against the interior of sleeve 1 at bore $b$. The remainder of the jaws protrude beyond the end of the sleeve 1.

A working tip 3 is accommodated within the sleeve 2 and is secured in position by the jaws $2^2$ in a manner which will be described more fully hereinafter.

The cylindrical body 4 has an enlarged ring portion $r$ at an end remote from the location where the sleeve 4 is threadably connected to end 2' of the sleeve 2. The ring portion $r$ rests on the upper edge of sleeve 1 and is provided with notches on its peripheral surface to enable turning of the ring portion $r$ for a purpose to be described later. The outer diameter of the ring portion $r$ is at least as great as that of body 1.

A regulating stem 5 is threadably engaged with body 4 and is in contact with tip 3. The stem 5 projects from the upper end of body 1 and is provided with a notch by which the stem can be engaged by a tool, such as a screwdriver, to permit the stem to be turned.

The tip 3 is secured in position by the application of inward radial pressure on the external conical surface of the jaws $2^2$. This inward radial pressure is applied by the lower edge of the sleeve 1 which is in contact with the external conical surface of the jaws. The pressure is developed by turning the ring portion $r$ in a direction in which the sleeve 2 is urged upwardly towards the ring portion due to the threaded engagement thereof with body 4. The pressure of the jaws against the tip may be reduced by turning the ring portion $r$ in the opposite direction.

The operation of the electrode according to the invention is relatively simple. In this regard, to engage a tip within the sleeve 1, the tip is inserted in inner sleeve 2 until it abuts the lower end of stem 5. The ring portion $r$ is then turned until the jaws lightly engage the tip to hold the same in position. The stem 5 is then turned to regulate the degree of protrusion of tip 3 from jaws $2^2$. When the tip has been adjusted to its desired position, the ring portion $r$ is turned to clamp the jaws on the tip and securely lock the same therein. To remove the tip 3, it is only necessary to turn the ring portion $r$ in the opposite direction to loosen the jaws whereby the tip can be removed.

The jaws $2^2$ have sufficient flexibility to enable use of tips of various diameters with the same electrode. This is a substantial advantage according to the invention, since a single electrode can be used to join elements of various sizes.

It is apparent from the above description of the electrode that it is effective to clamp the tip adjacent the working end thereof and retain the tip in releasable manner in the electrode. Moreover, the rotatable body 4 is effective to regulate the degree of clamping pressure on the tip, to enable ready adjustment of its projected length and securing thereof in the electrode.

Numerous modifications and variations of the disclosed invention will now become apparent to those skilled in the art without departing from the scope and spirit of the invention.

What is claimed is:

1. A spot welding electrode comprising an outer sleeve having opposite ends and a longitudinal bore, an inner sleeve within said bore including jaw means at one end thereof having radial flexibility, said jaw means including a plurality of separated jaw elements joined to said inner sleeve and extending beyond said outer sleeve, said jaw elements having an inclined surface in contact with said outer sleeve at one of the ends thereof, a tip clamped within said inner sleeve by said jaw means, rotatable means accessible externally of said outer sleeve and engaging the inner sleeve for longitudinally displacing the inner sleeve with respect to the rotatable means and the outer sleeve as the rotatable means is rotated to regulate radial deflection of the jaw means and thus control the clamping of the tip in the jaw means, said rotatable means comprising a rotatable body threadably attached to said inner sleeve at an end thereof remote from said jaw means, said rotable body resting on said outer sleeve, the latter preventing axial movement of said body towards said inner sleeve as the body is rotated, and adjusting means extending within said inner sleeve in contact with said tip for regulating the longitudinal position thereof within the inner sleeve, to compensate for wear of the tip, said sleeves, adjusting means, rotatable body and tip all being coaxial, said rotatable body having a bore therein, said adjusting means being threadably engaged with said rotatable body and extending through the bore in the rotatable body, said adjusting means including a stem extending from the outer sleeve at the end thereof remote from said one end.

2. An electrode as claimed in claim 1 wherein said rotatable body includes an enlarged ring portion resting on the outer sleeve.

3. An electrode as claimed in claim 2 wherein said ring portion has a peripheral surface with notches formed therein.

4. An electrode as claimed in claim 1 wherein said jaw elements have external surfaces in the form of two conical surfaces joined at their bases.

References Cited

UNITED STATES PATENTS

| 2,350,426 | 6/1944 | Thompson | 219—144 |
| 2,400,285 | 5/1946 | Buck | 219—144 |
| 2,422,265 | 6/1947 | Squires | 219—138 |

FOREIGN PATENTS

| 3,114 | 1906 | Great Britain. |
| 577,683 | 5/1946 | Great Britain. |

JOSEPH V. TRUHE, Primary Examiner

R. F. STAUBLY, Assistant Examiner

U.S. Cl. X.R.

219—68, 234; 401—93